Figure 1:
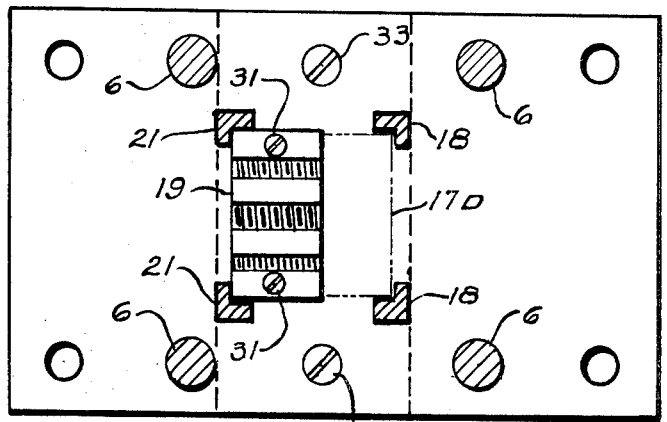

United States Patent

[11] 3,590,677

| [72] | Inventor | Maynard B. Smith<br>R.F.D. 2, Freeport, Maine 04032 |
| --- | --- | --- |
| [21] | Appl. No. | 820,742 |
| [22] | Filed | May 1, 1969 |
| [45] | Patented | July 6, 1971 |

[54] BOLT CUTTERS
7 Claims, 4 Drawing Figs.

[52] U.S. Cl. .................................................. 83/454,
83/463, 83/465, 83/620, 83/639, 83/694
[51] Int. Cl. ........................................................ B26d 7/02
[50] Field of Search............................................. 83/580,
454, 463, 464, 465, 620, 639, 694, 453, 456;
10/25

[56] References Cited
UNITED STATES PATENTS

| 276,265 | 4/1883 | Meyer | 83/463 |
| --- | --- | --- | --- |
| 385,662 | 7/1888 | Echols | 83/464 |
| 472,301 | 4/1892 | Lewis | 83/385 |
| 597,070 | 1/1898 | Seybold | 83/463 X |
| 833,496 | 10/1906 | Adams | 83/620 |
| 872,312 | 11/1907 | Waller | 83/454 |
| 1,624,590 | 4/1927 | Fleming | 83/464 X |
| 3,245,296 | 4/1966 | Valente | 83/694 X |

*Primary Examiner*—Frank T. Yost
*Attorney*—Abbott Spear

ABSTRACT: Cutters for externally threaded members are disclosed that have a clamp for holding the threaded member with a part that is fixed and a part that is movable. A power operated shear element and the fixed part of the clamp have coacting shear edges and the clamp is also operable as a die for reforming thread formations damaged during shearing.

PATENTED JUL 6 1971 3,590,677

INVENTOR
Maynard B. Smith
BY Albert Spray
Attorney

BOLT CUTTERS

The present invention relates to bolt cutters and particularly to bolt cutters for cutting long, threaded rods into desired bolt lengths.

While it is often necessary to shorten a bolt for a particular application, the common practice of using threaded rods, available in lengths as long as 6 feet, makes bolt cutting a usual procedure in many installations. Such cutting may be done with a hack saw with the bolt held in a vice or it may be done with power operated shears. In either case, the thread formation at the cut end may be so damaged that it cannot be used.

The general objectives of the present invention is to provide a bolt cutter adapted to be made in easily carried, power-operated embodiments enabling a threaded member to be sheared with minimum risk of damage and with means, operable as a die, to straighten any portion of the thread formation that may have been damaged during the shearing operation.

In accordance with the invention, these general objectives are attained with a cutter having a clamp including a fixed part and a part movable into and out of clamping relation to the fixed part and with their proximate faces each having at least one channel registering with a channel in the other to provide a holding passage for an externally threaded member. A shear element is attached to an operation unit with which the cutter is provided, desirably a power operated device operated by fluid under pressure. The shear element is supported by the operating unit for movement along a path inclusive of the position of the exposed end of a threaded member held by the clamp and with the edge of the member-engaging portion of the shear member that is proximate to the clamp in shearing relation to the proximate edge of the member-supporting channel of the base of the clamp.

While such cutters are operable to quickly and accurately sever the threaded member, some damage to its threads may result. To this end, the clamp is made to function as a thread-shaping die by having the channels forming the member-holding passage provided with thread segments appropriate for the threaded member being shortened and desirably the clamp parts are each formed with a plurality of channels so that the cutter may be made to function with a suitably wide range of threaded member sizes.

Another important objective of the invention is to have the member-engaging portion or portions of the shear element in the form of a channel or channels, each preferably threaded in the same manner as the channels of the clamp with which it is in alignment as the shearing results are best effected with the thread member held by the clamp as if threaded therethrough and with the force of the shear element applied against the entire thread formation through a substantial arcuate portion.

In the accompanying drawings, there is shown an embodiment of the invention illustrative of these and other of its objectives, novel features, and advantages.

Figure 4:
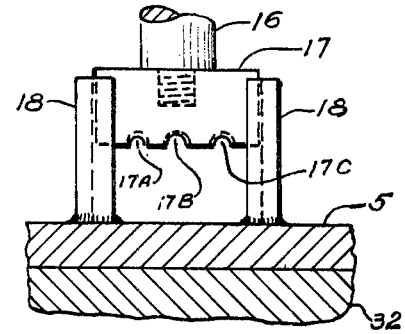
Figures 2, 3:
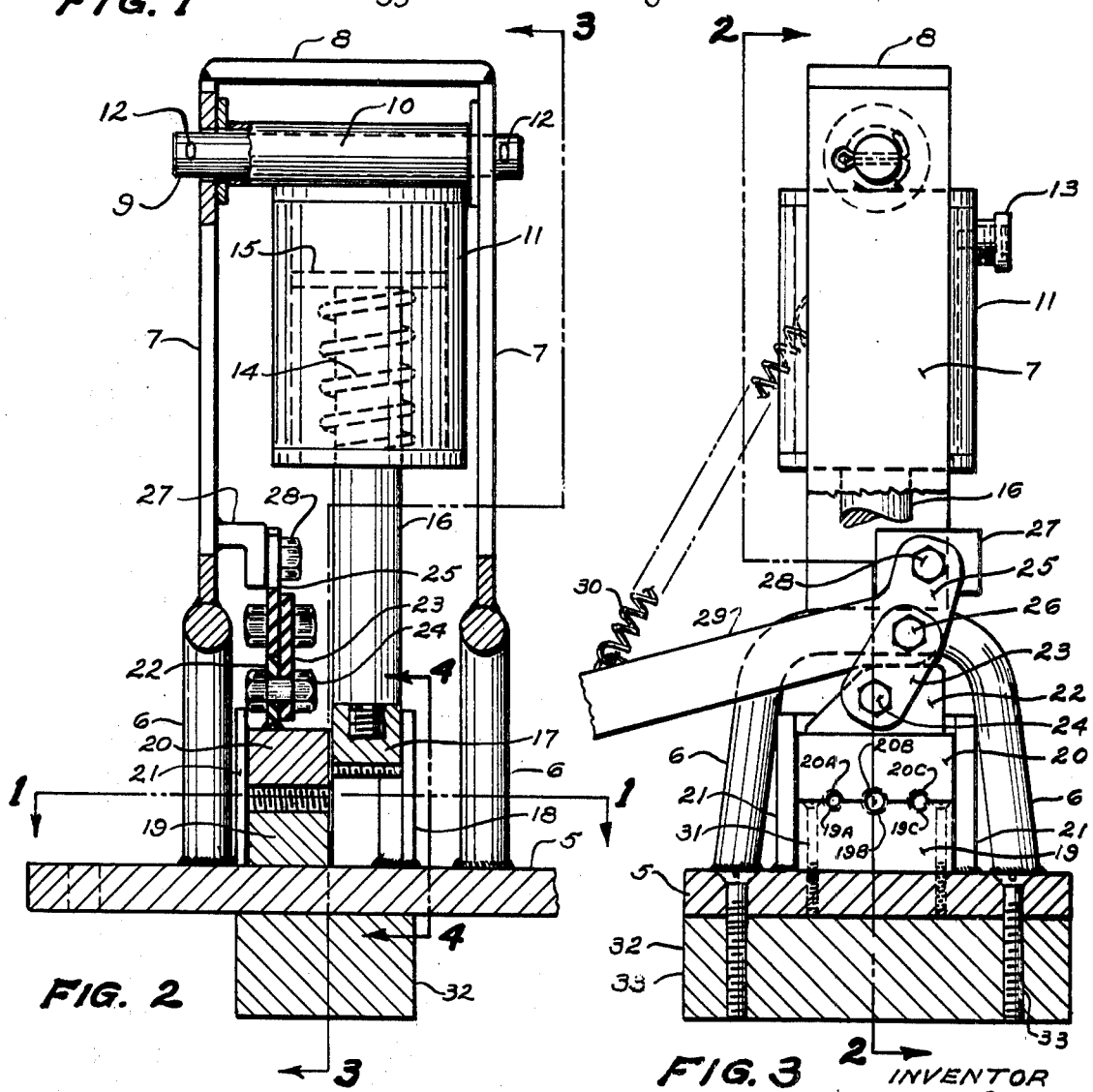

In the drawings:

FIG. 1 is a section taken approximately along the indicated lines 1–1 of FIG. 2, FIG. 2 is a section taken approximately along the indicated lines 2–2 of FIG. 3, FIG. 3 is a section taken approximately along the indicated lines 3–3 of FIG. 2, and FIG. 4 is a fragmentary section taken approximately along the indicated lines 4–4 of FIG. 2.

The cutter shown in the drawings has a base 5 on which are mounted aligned supports 6 of an inverted U-shape, to which the sides 7 of a hanger are welded. The sides 7 support the ends of a pin 9 extending through a sleeve 10 to which the upper end of the cylinder 11 of a fluid pressure operated unit is attached thus to support the unit in a depending position. The ends of the pin 9 are held against axial movement by cotter pins 12 to enable the fluid pressure unit to be easily removed.

The fluid pressure operated unit is shown as a hydraulically operated type having a fitting 13 for use in connecting a pump thereto such as a manually operated hydraulic pump. A spring 14, see FIG. 2, within the cylinder 11 yieldably holds the piston 15 in its raised, inoperative position. The piston stem 16 has a shear element 17 threaded on its exposed end with its vertical path defined by corner guides 18.

Between the path of the shear element 17 and one of the supports 6, there is a clamp consisting of a bottom part 19 secured to the base 5 and a vertically movable part 20.

The movable clamp part 20 has its vertical path defined by corner guides 21 and the proximate face of the shear element 17. The movable part 20 has an ear 22 to which a link 23 is connected by a pivot 24. The link 23 is also connected to a link 25 by a pivot 26 and the link 25 is connected to a bracket secured to the proximate hanger wall 7 by a pivot 28 and the thus established toggle joint is actuated by means of the angularly disposed handle portion 29 of the link 25. The handle portion 29 is yieldably held by a spring 30 in a position to insure that the clamp is normally open. When the handle portion 29 is swing downwardly to close the clamp, see FIG. 3, its edge 29A is in engagement with the upper edge of the ear 22 thus effectively locking the clamp closed.

The proximate faces of the clamp parts 19 and 20 are each provided with parallel channels, those for the clamp part 19 being indicated at 19A, 19B, and 19C and those for the clamp part 20 being indicated at 20A, 20B, and 20C. The channels are semicircular in cross section and the corresponding channels register when the clamp is closed providing passages, each dimensioned and threaded as a die for a threaded member of a particular diameter and thread. With this construction, when the clamp is closed on a threaded member, it is held as if it were threaded therethrough.

The bottom face of the shear element 17 is also provided with channels 17A, 17B, and 17C, each of semicircular section and in alignment with the corresponding channels of the clamp parts, each channel of the same width as that of the channel with which it is in alignment and provided with the same thread formation as that of the corresponding channel of the clamp part 20.

In use, a threaded member is placed in the appropriate channel of the bottom clamp part 19 with the portion that is to be severed exposed in the path of the shear member 17. The handle portion 29 is then swung downwardly to seat the movable clamp part 20 against it and to lock the clamp closed. The pressure operated device is then operated.

As the pressure in the cylinder 11 builds up, the shear member 17 becomes seated against the exposed end of the clamped threaded member. When the pressure is adequate to overcome the resistance of the bolt, the exposed end is sheared off.

It will be noted that the edge of the member engaging channels that are proximate to the clamp and the proximate edges of the channels of the base 19 of the clamp are in shearing relation when the fluid pressure operated unit is operated and that not only is the threaded member held by the clamp as if threaded therethrough but also the shear element 17 engages a substantial length of the entire thread formation through an arc of approximately 180°. This feature ensures that the shearing is effected with the risk of thread damage minimized. It will also be noted that the proximate faces of the clamp parts 19 and 20 and of the shear element 17 are plane, vertical surfaces with those of the clamp being guide surfaces for the shear element 17 and that of the shear element 17 being a guide surface for the movable clamp part 20.

Should thread deformation occur, the clamp is opened and the severed section of the threaded member is in the appropriate channel in the clamp part 19 but with its newly formed end positioned short of the shear surface end thereof. The clamp is then closed and it now functions as a thread-reforming die ensuring that the shortened bolt is in condition for use.

The clamp parts are easily removed and replaced as the lower clamp part 19 is held in place by screws 31. While the movable clamp part 20 is removed by disassembling the pivot 24. As previously stated, the shear element 17 is threaded on the stem 16 and is easily removed by detaching the supporting pin 9.

Cutters for threaded members in accordance with the invention are, accordingly, well adapted to meet a wide range of requirements. The embodiment of the invention shown in the drawings is adapted to be vise held as it has a rib 32 underlying the base 5. The rib 32 is secured by screws 33 so that it can be removed if the cutter is to be otherwise held or supported.

I claim:

1. A cutter for an externally threaded member comprising a support including a base, a work holding clamp including a part fixed on said base and a second part movable into and out of clamping relation to the fixed part and connected to the support, the proximate faces of the clamp parts having channels which register to provide a holding passage for the member when the clamp is closed, a shear element having a channel, and an operating unit attached to said support and connected to the shear element and operable to move the shear element along a path such that its channel receives the portion of the exposed end of a threaded member held by the clamp and with the edge of the member-engaging portion of the shear member that is proximate to the clamp in shearing relation to the proximate edge of the member-supporting channel of the base of the clamp, each channel having a thread formation appropriate for that of the threaded member.

2. The cutter of claim 1 in which the threaded channels, when the clamp is closed, provide a passage holding a threaded member as if threaded therethrough and are operable as thread reforming dies.

3. The cutter of claim 1 in which the clamp parts have a plurality of parallel channels, corresponding channels registering when the clamp is closed, each pair of registering channels being provided with a thread formation appropriate for that of a threaded member and different than that of any other pair of registering channels and the undersurface of the shear element has a plurality of parallel channels, each in alignment with an appropriate one of the pairs of registering channels and provided with the same thread formation.

4. The cutter of claim 3 in which the pairs of registering channels differ in diameter.

5. The cutter of claim 3 in which each of the pairs of registering channels, when the clamp is closed, provides a passage holding the appropriate threaded member as if threaded therethrough and operable as coacting thread reforming dies.

6. The bolt cutter of claim 1 in which the operating unit is of the fluid pressure operated type and normally holds the shear element in an inoperative position, a pivoted connection between the support and the unit holds the unit in a depending position, and the base includes corner guides for the shear member.

7. The bolt cutter of claim 1 in which the base includes corner guides for the remote portions of the movable clamp part and the shear element, and the faces of the clamp parts that are proximate to the shear element are in vertical alignment and constitute a guide surface for the shear element and the shear element constitutes a guide surface for the movable clamp part.